United States Patent Office 2,727,888
Patented Dec. 20, 1955

2,727,888
TINCTORIAL FORM OF A RED AZO LAKE

Chester W. Hannum, Wilmington, Del., assignor to E. I. du Pont de Nemours and Company, Wilmington, Del., a corporation of Delaware No Drawing. Application November 9, 1951,
Serial No. 255,745

1 Claim. (Cl. 260—202)

This invention relates to an improved form of a particular pigment lake useful in the arts of coloring paper and rubber or in printing or painting formulations. It is an object of this invention to produce said lake in a form having improved tinctorial properties, especially as regards strength, brightness and shade. Other objects and achievements of this invention will become apparent as the description proceeds.

The particular pigment lake above referred to is the calcium salt of the azo dye obtained by diazotizing 4-amino-2-chloro-toluene-5-sulfonic acid and coupling, in the presence of calcium hydroxide, 2,3-hydroxynaphthoic acid. Accordingly, the lake may be designated as the calcium lake of 4-(5-chloro-4-methyl-2-sulfophenylazo)-3-hydroxy-2-naphthoic acid.

When this compound is synthesized by the process hereinabove indicated, it possesses a yellowish-red shade and reasonably good tinctorial strength and brightness. For certain purposes, however, a more bluish shade of red is desirable.

I have now found that a lake of pleasing bluish red shade, improved tinctorial strength and improved brightness is obtained if the aforementioned lake is heated in aqueous suspension in the presence of a strong alkali sufficient to give the suspension a pH of 9.5 or higher, up to 14.

The theory of the action of hot alkali on the mentioned lake is not clearly understood. It is known that the calcium salt of the mentioned azo compound is bluer than the sodium salt. Inasmuch as the observed change in shade is in the opposite direction, cationic substitution would not explain the change. It is conceivable that the treatment effects a change in crystalline structure of the lake, or perhaps some special degree of hydration thereof. Accordingly, I do not desire to limit my invention to any particular theory.

As alkali for the aforementioned purpose may be used an alkali-metal hydroxide, calcium hydroxide or an alkali-metal carbonate. The concentration of the lake in the aqueous suspension is not critical, and may vary from 2% (a thin slurry) to 25% (a soft paste). The temperature of heating is preferably in the range of 70° to 100° C.

The duration of the heating is best determined by observations on samples taken from the reaction mass or by experience based on such observations. Heating is discontinued when the test sample is found to be sufficiently bluer than the initial material for the particular purpose on hand. At 90° C., improvement may be observed after heating for 15 minutes, whereas at 65° to 70° C. a heating period of 20 hours may be required.

The above alkaline treatment may be applied directly to the reaction mass in which the azo coupling takes place, or the color may be filtered off and then redispersed in a suitable volume of water to the desired concentration. Dispersing agents may be added to the aqueous mass, if desired.

Without limiting my invention, the following examples are given to illustrate my preferred mode of operation. Parts mentioned are by weight.

Example 1

An aqueous filter cake of the calcium salt of the monoazo dye obtained by coupling diazotized 4-amino-2-chloro-toluene-5-sulfonic acid to 3-hydroxy-2-naphthoic acid in the presence of calcium hydroxide, and containing 200 parts of the monoazo lake, is diluted with water to a total of 1000 parts. The thick paste thus obtained is thinned under agitation by addition of 30 parts of dry, partially desulfonated sodium lignin sulfonate. To this slurry is added 10 parts of sodium hydroxide. The mass is then heated to 70° C. and agitated at 70° to 90° C. for 16 hours. If a test sample shows that the desired shift in shade toward the blue is insufficient when tested on paper by the beater dyeing technique, the mass is heated for 4 hours longer or until the desired shade is reached. The product may be standardized for the market directly as a paste, either with or without a reduction of pH, or it may be dried and standardized as a powder.

The sodium lignin sulfonate above functions as a dispersing agent and may be omitted, in which case, however, it is advisable to add additional water to insure proper agitation and mixing.

Example 2

18.5 parts of 4-amino-2-chloro-toluene-5-sulfonic acid are diazotized and coupled to 16.8 parts of 3-hydroxy-2-naphthoic acid in a medium made slightly alkaline (orange color on Brilliant Yellow test paper) by the addition of calcium hydroxide. The mass is diluted with water to a total weight of 1000 parts. 3.22 parts of sodium hydroxide are then added to raise the pH to 12.5±.2. The mixture is heated to 85° C., held at that temperature for 1 hour, and filtered. The resulting filter cake may be reslurried, dispersed in presence of latex and precipitated with the latex to form highly colored rubber crumb, by methods known to those skilled in the art. This rubber crumb may then be mixed in a rubber mill with uncolored material to produce final products of the desired color intensity. Bluer and brighter shades and increased tinctorial value are achieved in comparison to material which has not been given the hot alkaline treatment before filtration.

When the sodium hydroxide in the above example is replaced by 3.0 parts of calcium hydroxide, 4.5 parts of potassium hydroxide, or 4 parts of sodium carbonate, similar results are obtained.

It will be clear that the details of the above examples may be varied within the skill of those engaged in this art.

I claim as my invention:

Process for improving the tinctorial qualities of the calcium lake of 4-(5-chloro-4-methyl-2-sulfophenylazo)-3-hydroxy-2-naphthoic acid, which comprises heating an aqueous suspension of said lake at a temperature of 70° to 100° C., and in the presence of an alkali selected from the group consisting of the alkali-metal hydroxides, the alkali-metal carbonates and calcium hydroxide, until the shade of the said lake undergoes an observable shift from its initial yellowish red to a bluish red, the concentration of said lake in said aqueous suspension being not less than 2% and not more than 25% by weight, and the alkalinity of said aqueous suspension being of a value corresponding to a pH not less than 9.5.

References Cited in the file of this patent
UNITED STATES PATENTS

| Number | Name | Date |
|---|---|---|
| 983,486 | Ernst et al. | Feb. 7, 1911 |
| 2,013,100 | Headley | Sept. 3, 1935 |
| 2,117,860 | Siegel | May 17, 1938 |
| 2,189,806 | Lang et al. | Feb. 13, 1940 |
| 2,453,490 | Callaway | Nov. 9, 1948 |